(12) United States Patent  (10) Patent No.: US 7,586,067 B2
Hill  (45) Date of Patent: Sep. 8, 2009

(54) WEIGHT-ADJUSTABLE FOOD PRESS FOR COOKING

(76) Inventor: Bruce M. Hill, 757 Fillmore St., San Francisco, CA (US) 94117

( * ) Notice: Subject to any disclaimer, the term of this patent is extended or adjusted under 35 U.S.C. 154(b) by 421 days.

(21) Appl. No.: 11/174,233

(22) Filed: Jul. 1, 2005

(65) Prior Publication Data

US 2007/0000391 A1  Jan. 4, 2007

(51) Int. Cl.
*H05B 6/80* (2006.01)
*A47J 37/06* (2006.01)

(52) U.S. Cl. .................... 219/729; 219/732; 99/349

(58) Field of Classification Search ........... 99/349–351, 99/372, 374, 377, 379, 427, 448, 450; 100/104, 100/110, 116, 193–195; 219/732–734; 426/512, 426/513, 517
See application file for complete search history.

(56) References Cited

U.S. PATENT DOCUMENTS

| | | | |
|---|---|---|---|
| 2,310,956 A * | 2/1943 | Hoy | 99/351 |
| 3,207,059 A | 9/1965 | Hirons | |
| 3,623,422 A | 11/1971 | Marshall | |
| 4,173,926 A * | 11/1979 | Brignall | 99/349 |
| 4,217,817 A | 8/1980 | Meamber | |
| 4,272,663 A | 6/1981 | Green | |
| 4,617,859 A | 10/1986 | Nichols | 99/351 |
| 4,635,538 A | 1/1987 | Polster | 99/349 |
| 4,702,159 A | 10/1987 | Polster | 99/349 |
| 2001/0031302 A1 | 10/2001 | Balkos et al. | |
| 2003/0051608 A1 | 3/2003 | Prip | |
| 2004/0255792 A1 | 12/2004 | Parker | |

OTHER PUBLICATIONS

Norpro Grill/Bacon Press, http://www.amazon.com/exec/obidos/tg/detail/-/B00004UE7B/104-8292557-8219914?v=glance (printed Oct. 7, 2005).
Lodge Grill Press, by Lodge Logic, http://www.amazon.com/gp/search/ref=xs_ ap_ l_ xgl79/104-8292557-8219914?index=kitchen&keywords=Lodge%20grill%20press; http://www.amazon.com/exec/obidos/tg/detail/-/B0009J4B0W/ref=sr_ l_ 7/104-8292557-8219914?%5Fencoding=UTF8 &v=glance; http://www.amazon.com/exec/obidos/tg/detail/-/B00008GKCK/ref=sr_ l_ 8/104-8292557-8219914?%5Fencoding=UTF8&v=glance; http://www.amazon.com/exec/obidos/tg/detail/-/B00008GKCK/ref=sr_ l_ 8/104-8292557-8219914?%5Fencoding=UTF8&v=glance; http://lodge.pans.com/products/Lodge_ Grill_ Press_ 10954.html (printed Oct. 7, 2005).

(Continued)

*Primary Examiner*—Quang T Van
(74) *Attorney, Agent, or Firm*—Fliesler Meyer LLP

(57) ABSTRACT

A food press utensil is disclosed that varies incrementally as needed a weight of the utensil for pressing and cooking different food items on a cooking surface, wherein weight adjustment of the food press, by stacking of a plurality of food presses or other compatible weights, results in even heat distribution on the food to allow for uniform cooking and browning. The food press further can comprise a plurality of apertures through the body of the food press, to allow steam to vent and thus to prevent the food from becoming soggy as it cooks. The food press also can be made to accommodate a surface area of the food that exceeds a surface area of the food press, and thus can be used in any pan or griddle. The invention further can comprise a scraper surface to effect debris removal and preparation of the food cooking surface.

23 Claims, 9 Drawing Sheets

OTHER PUBLICATIONS

Grill Press, Williams-Sonoma, Inc., http://wwl.williams-sonoma.com/cat/pip.cfm?skus=4602835 &pkey=xsrd0m1%7C15%7C0%7C%7C% 7C%7C%7C%7Cgrill%20press&gids=sku4602835&cmsrc=sch (printed Oct. 7, 2005).

Grill Press—Nordic Ware, http://www.nordicware.com/b2c/search_results_details.cfm?prodid=34&searchtext=grill%20press&startrow=1 (printed Oct. 7, 2005).

Grill Press, Burgers' Smokehouse, http://www.smokehouse.com/burgers.nsf/x/F89260C5151A409586256 F00005AD674 (printed Oct. 7, 2005).

Lodge® Cast Iron Round Bacon/Grill Press, http://shop.store.yahoo.com/ruralroot-store/locairrobapr.html (printed Oct. 7, 2005).

Panini Press, Le Creuset, http://www.lecreuset.com/usa/products/guide.php?category_id=16 (printed Oct. 7, 2005).

Grill and Bacon Press, The Vermont Country Store, http://www.vermontcountrystore.com/jump.jsp?itemID=10603 &itemType=PRODUCT&searchid=inceptor (printed Oct. 7, 2005).

International Search Report and Written Opinion for PCT/US06/25517, dated Jan. 28, 2008, 9 pages.

* cited by examiner

WEIGHT-ADJUSTABLE FOOD PRESS FOR COOKING

TECHNICAL FIELD

This invention relates generally to a cooking utensil, and in particular to a food press used in cooking.

BACKGROUND OF THE INVENTION

Food presses are used to flatten food, such as meat, chicken, or fish, against a cooking surface, so that the heat of the cooking surface is distributed evenly around the food, causing it to brown uniformly. Without a food press to flatten the food against the cooking surface, the food may curl up, and heat may be distributed unevenly, causing the food to burn in some areas and to remain under-cooked in others.

Food presses exist in the art of cooking utensils, but such food presses present obstacles that prevent optimal food preparation. For example, existing food presses are made to a single, particular weight. A food press may be too light-weight to accomplish its purpose, i.e., to keep the food flat against the cooking surface while the food is cooking. Alternatively, other food presses may be too heavy for certain foods, and may crush the food beyond merely flattening it against the cooking surface. For instance, while a heavy food press may be well-adapted for a thick steak or a chop, the heavier weight is inappropriate for browning a relatively less-dense, more delicate fish filet, chicken filet, potatoes, vegetables and/or fruits. The latter fare would be crushed by a heavy food press, and possibly burned during cooking. Conversely, a light-weight food press may not suffice to flatten and evenly cook the steak or a chop, while it will suffice for browning and cooking the fish, chicken, etc. Accordingly, unless a cook—for example, a chef, or a household user of such food presses—owns several food presses of different weights, the cook must use the same food press for all different food preparations and tolerate the cooking drawbacks.

A further drawback of having numerous food presses is that it is cumbersome to handle many different versions of essentially the same utensil while one is busy cooking. A cook may have to hunt around for one of several food presses while the cook also is busy with open flames and/or other hot surfaces, and/or while tending to several ongoing cooking projects that may require close attention. A need exists in the art for a food press whose weight can be varied conveniently to accommodate cooking different types of food, e.g., meat versus fish, on a cooking surface.

A further drawback currently in the art of cooking utensils is that food presses with solid, flat surfaces will cause the food to become soggy when used to cook food in a pan or on a griddle, because solid, flat surfaces do not allow moisture from the food and the cooking surface to vent as steam. Moisture thus becomes trapped around the food that is being pressed and cooked, and the cooked food is not cooked as desired, i.e., with even distribution of temperature for uniform cooking, and even browning.

It would also be convenient to have as part of a food press utensil a means for cleaning and/or preparing a cooking surface, for example a pan or griddle (wherein the term "griddle" also may be referred to herein, interchangeably, with the term "plancha"). That is, a food press utensil would be more useful if it could be applied easily to clean away debris on the cooking surface after the food is browned and removed, to prepare the cooking surface for further use. A scraping feature would address the current need in the art for a cook to reach for a separate tool, for example a spatula, to scrape the cooking surface, or to apply a food press awkwardly to the cleaning/scraping task.

Another food press drawback that exists in the art is that currently, food presses that have holes through the flat pressing surface are fitted to conform only to a pan of a particular size and shape, and are quite heavy, weighing five pounds. Such presses are not useful in pans that may be smaller than the surface area of the press itself, or in pans that hold more food than the food press can cover. Also, as discussed above, a heavy press is unsuitable for cooking more delicate fair that would be crushed by a heavy utensil. A need exists for food presses that have apertures through the flat food press surface to allow steam to vent, which also can be made in a variety of shapes and sizes, that can be varied in weight, and/or that can be configured to cover additional surface area beyond the amount covered by a single food press. Moreover, a need for better venting exists, that would allow more steam to escape and to optimize cooking quality.

The present invention addresses these needs. The following disclosure teaches different embodiments of a food press invention. The food press utensil invention comprises an apparatus with apertures through the food press surface to allow even browning. At least one additional food press utensil can be stacked on another, to vary the weight of the food press utensil incrementally, or in another embodiment, stackable weights can be added to the food press utensil to vary the weight. In a preferred embodiment, at least two food press utensils, and up to a plurality of food press utensils, can be configured to cover and press/cook food having a surface area greater than that of a single food press utensil. Preferred embodiments of the invention will have apertures through the food press surface to allow steam to vent and to prevent the food from becoming soggy as it cooks. A further embodiment comprises a scraper tool to facilitate cleaning and preparation of a cooking surface for cooking food.

DETAILED DESCRIPTION

Embodiments of the present invention provide for a cooking utensil, in particular, a weight-adjustable food press utensil for cooking. Embodiments provide for a food press utensil that is used to press food, including meat, chicken, fish, vegetables, fruit, etc., evenly against a cooking surface, such as a pan, griddle, or other heated cooking surface, so that heat from the cooking surface is distributed uniformly around the food, and the food browns evenly without becoming soggy. In a specific preferred embodiment, the food press utensil can: have a plurality of slots through the food press body to allow steam to vent so that the pressed food browns evenly without becoming soggy; be stackable, so that one food press can be stacked on another or several others to vary incrementally the weight of the food press utensil based on an appropriate weight for the type of food being cooked; be configured with at least one other food press to press food having a surface area greater than the surface area of a single food press utensil; have a scraping edge along the length of the food press body for removing debris from the cooking surface; have a handle for gripping the food press utensil; and be made of stainless steel. Further embodiments of the present invention also provide for stacking incremental weight onto the food press utensil, and for venting. Other embodiments also are contemplated by the invention described herein below.

Figure 1:
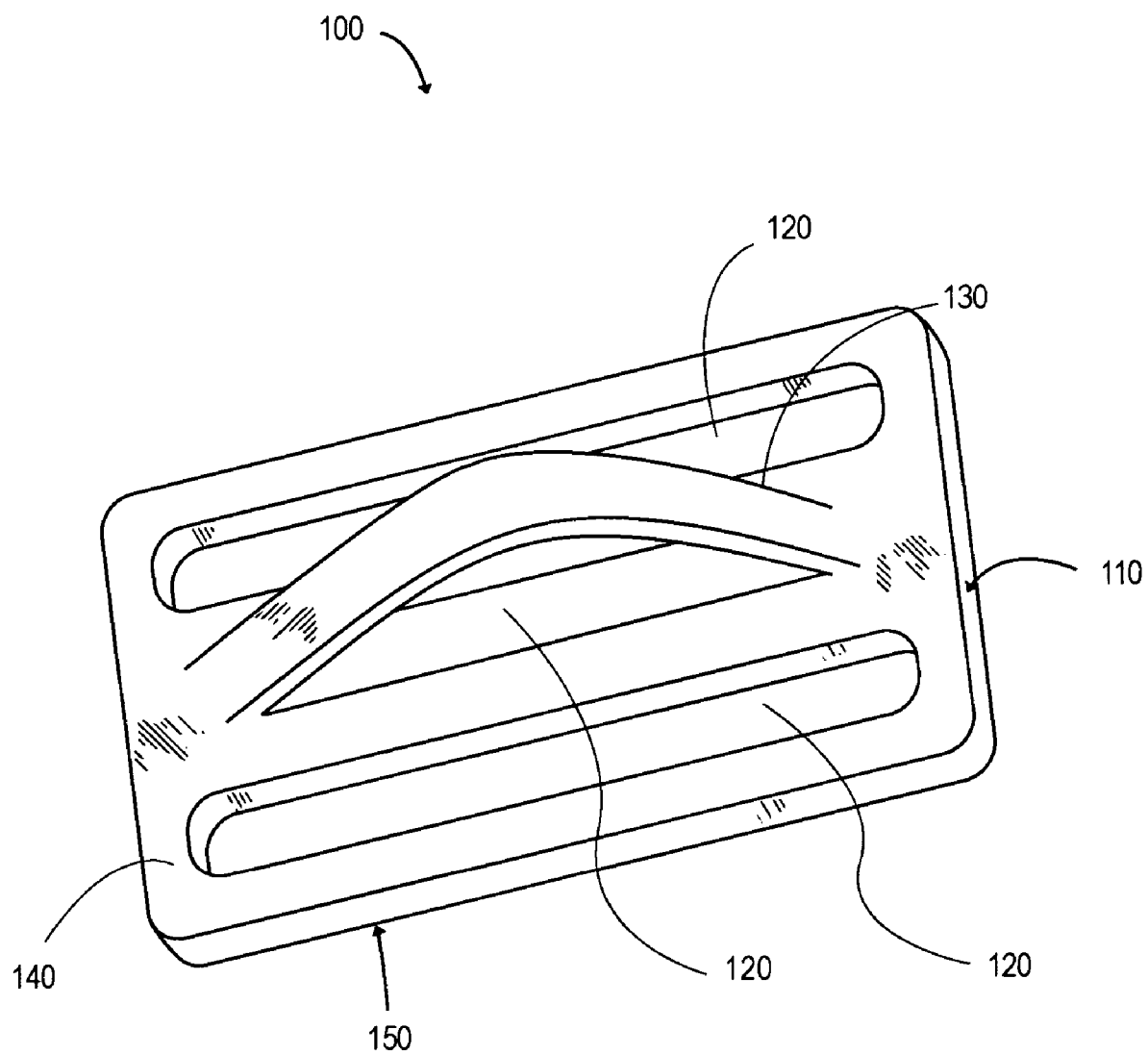
FIG. 1 shows a top-down view of an embodiment of the food press utensil of the disclosed invention.

FIG. 1 shows a top view of a preferred embodiment of a single food press utensil 100 of the invention. In this embodiment, the food press utensil 100 can comprise a body 110, which is used to press almost any kind of food, including, meat, chops, chicken, fish, vegetables, fruit, etc., so that the food is pressed evenly against a heated cooking surface, and does not curl up as it cooks. Pressing the food so that it is even with the cooking surface evenly distributes the heat from the cooking surface about the food, so that the food cooks uniformly, that is, without leaving some parts of the food under- or un-cooked, while other parts burn or are over-done. The body 110 can be rectangular in shape, as depicted in FIG. 1. In a preferred in embodiment, the body is about 5 inches long by 4 inches wide. However, it is to be understood that the body 110 also can be square or have another polygonal shape, or can be circular, or oblong, and can have different dimensions of length and width than those of the preferred embodiment.

Figure 2:
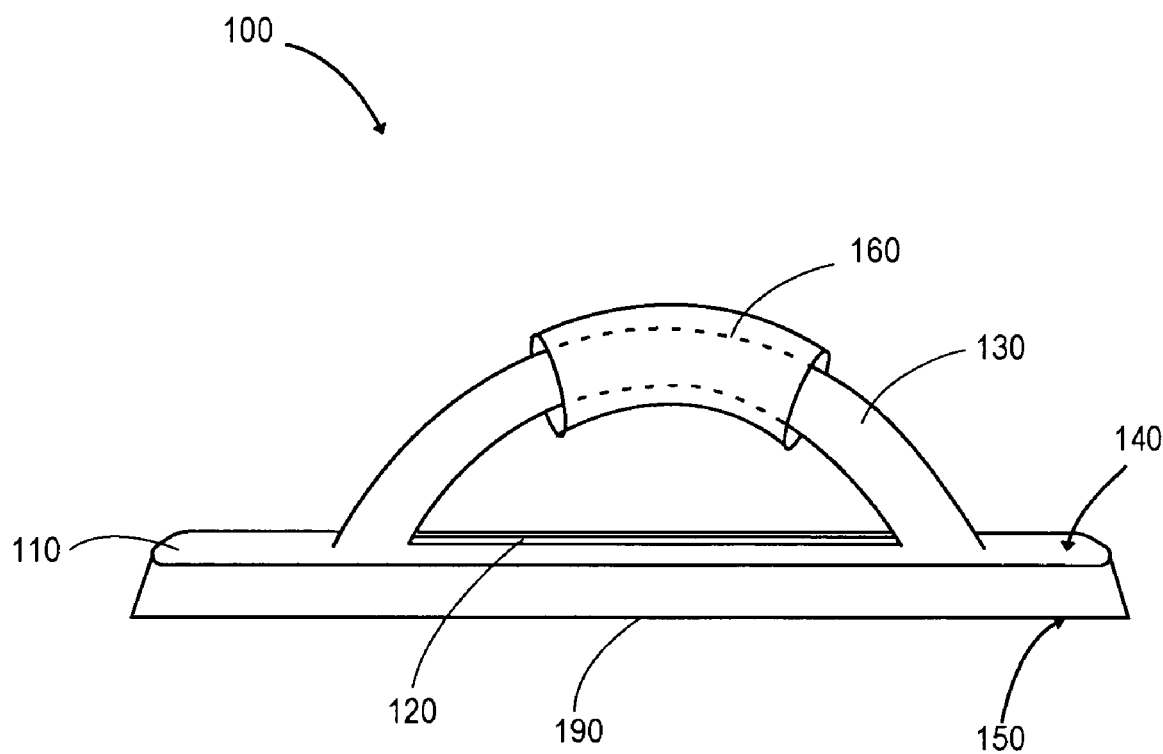
FIG. 2 shows a side view of the food press utensil of the embodiment of the invention depicted in FIG. 1, having also an additional handle element for protecting the user from heat.

The body 110, as shown by the side view of FIG. 2, comprises an upper surface 140 and a lower surface 150. A cook can hold the handle 130 to press down or simply place the food press 100 on the food, so that the lower surface 150 is pressed against the food from above the cooking surface and the food. The lower surface 150 of a body 110 of a food press utensil 100 might also come to rest upon an upper surface 140 of another body 110 of another food press utensil 100, if at least two such food press utensils 100 are stacked upon each other, as discussed in detail below.

The embodiment 100 depicted in FIG. 1 further can comprise at least one aperture 120 that extends through the body 110 between the upper surface 140 and the lower surface 150 of the body 110 (see FIG. 2, e.g.). The apertures can be in the form of slots 120, which allows moisture from the pressed food to vent as steam away from the food as it cooks. The venting allows the food to brown and avoid becoming soggy, and the weight of the body 110 ensures that browning is even over the surface of the pressed food. Three slots 120 are depicted in the preferred embodiment in FIG. 1; however, the invention also contemplates that an embodiment can have any number of slots, said slots having varying dimensions that can accommodate venting to allow even browning.

Figure 6:
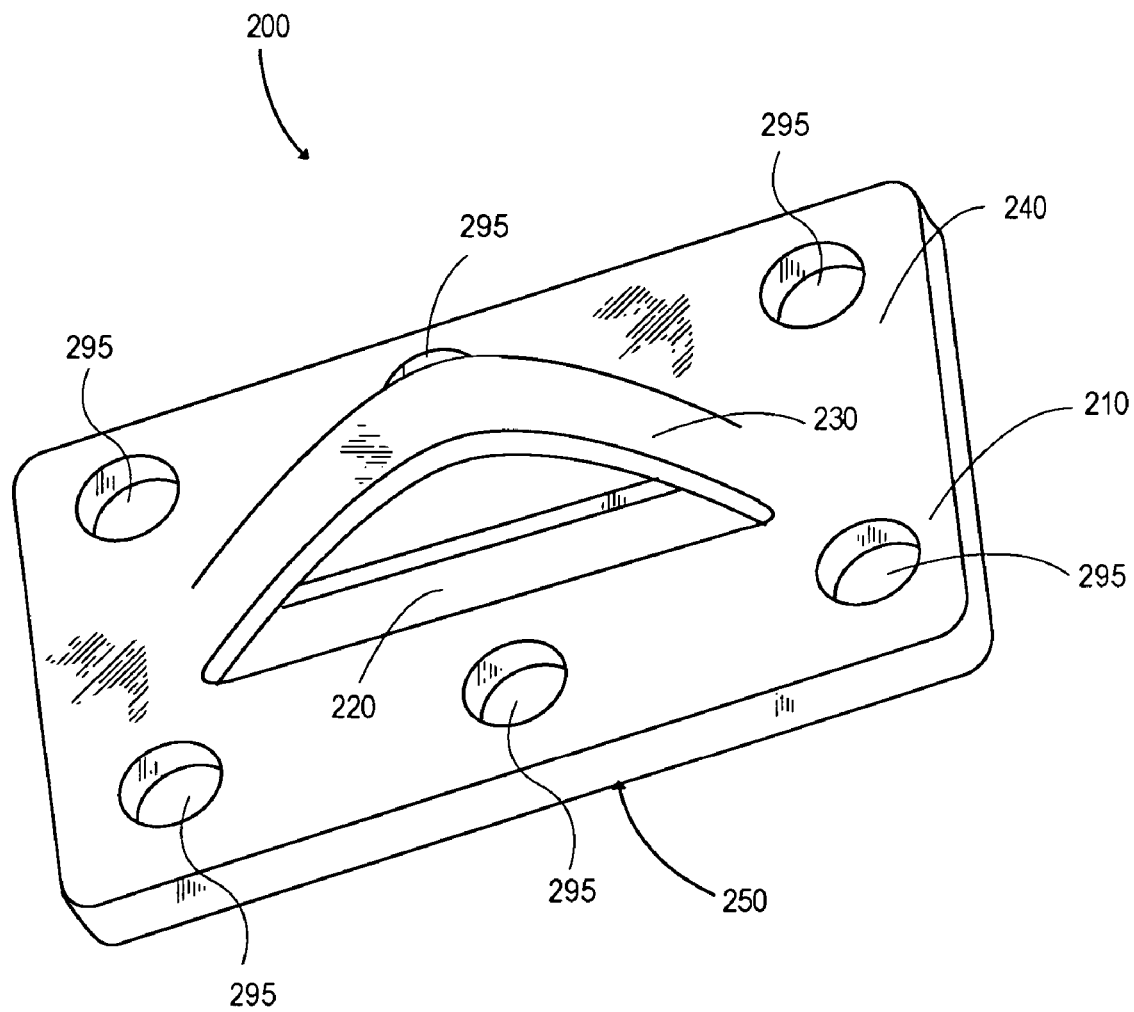
FIG. 6 depicts a top view of a further embodiment of the food press utensil of the disclosed invention.
Figure 7:
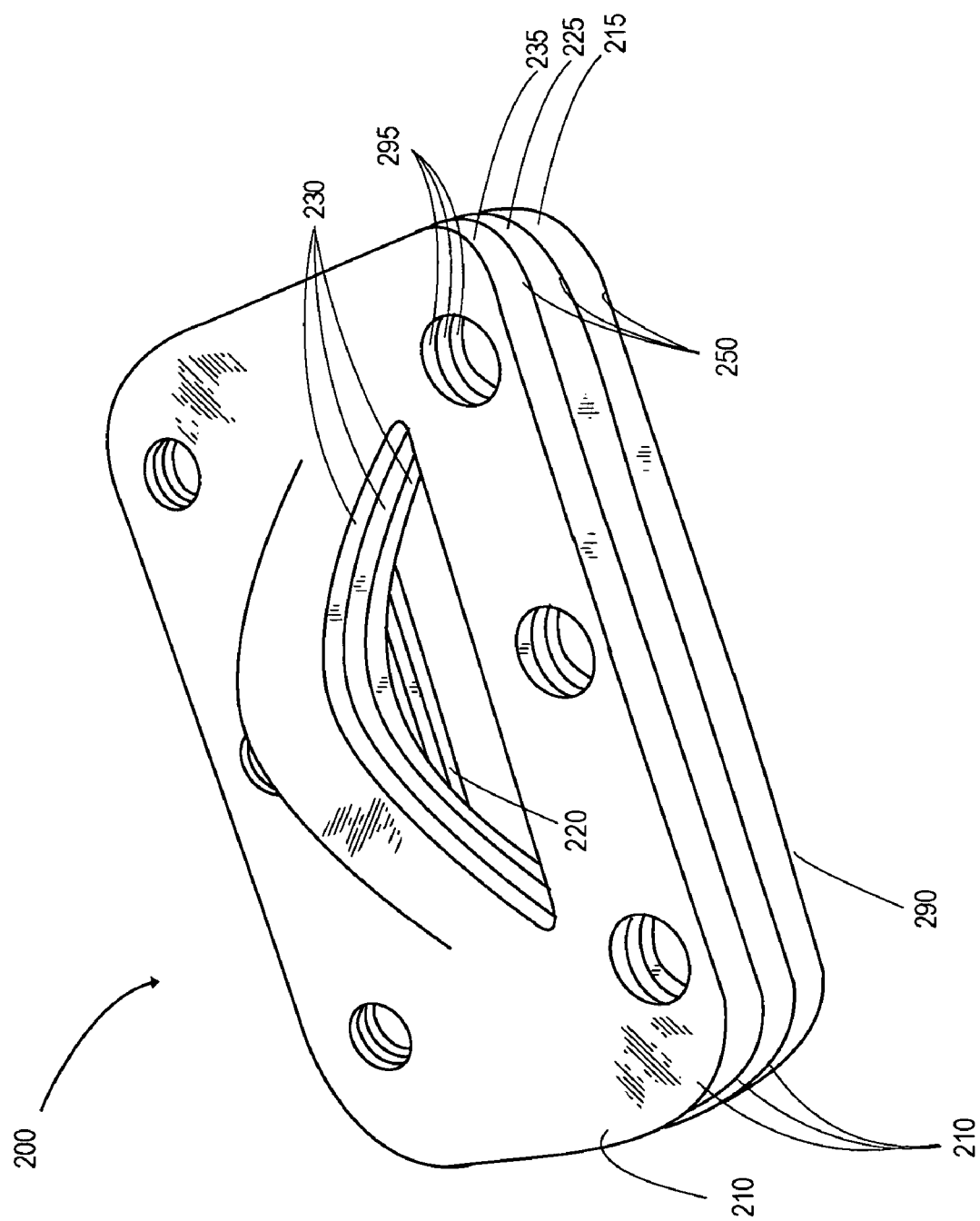
FIG. 7 depicts a top-down view of three of the food press utensil embodiments of the disclosed invention depicted in FIG. 6.

It is also to be understood that the apertures need not be slots. In alternative embodiments to be discussed herein below, the apertures can take any shape, for example, circular holes 295 as depicted in FIGS. 6-7, or holes with any other shape that permits venting to achieve the objectives as set forth herein. Slots 120 also can be mixed with such apertures of different shapes, for example, slots with round holes, as will be the case where apertures of different shapes are cut into the body 110, and a handle 130 is cut and bent directly outward from the same body 110 material, leaving a slot 120 in the body 110 beneath the handle 130. See, e.g., FIGS. 6-7.

As shown in FIG. 1, a preferred embodiment also can comprise at least one handle 130 for gripping the food press utensil 100 during cooking, to remove the food press utensil 100 or to press it down onto the food as the food cooks. It is contemplated that a single handle 130 will be oriented parallel to an edge of the food press utensil 100. In a preferred embodiment, the handle 130 is oriented parallel to a long edge of a rectangular-shaped body 110, and is centered so that the handle 130 is balanced relative to the food press utensil 100. It is to be understood that handle 130 can be oriented in any direction for any shape of food press utensil 100; in a preferred embodiment, the handle is balanced relative to the food press utensil 100.

In a preferred embodiment, the food press utensil 100 can be made from a single piece of metal, and the handle 130 can be cut and pressed out of the metal of the body 110. To achieve this configuration, the metal of the body 110 can be cut to create a slot 120, and the handle 130 can be bent out of the plane of the body 110 for gripping. See also, for example, FIG. 6. This method of manufacture makes for simplicity in manufacturing. However, the disclosed invention further contemplates welding, applying screws or other fasteners, or otherwise connecting the handle 130 with the body 110. In the latter case, a slot 120 through the body 110 could be cut beneath the handle 130; alternatively, a slot 120 need not be cut through the body 110 beneath the handle 130.

As depicted in FIG. 2, the handle 130 further can have a heat-protection element 160 to protect a user, e.g., a chef in a restaurant, or an at-home cook, from heat conducted from the heated cooking surface. The heat-protection element 160 can be a rubberized plastic cover that can be, for example, tubular to cover at least a portion of the handle 130, or all of the handle 130. It is to be understood that the heat-protection element 160 can be made of any heat-resistant material that is not flammable and will not melt, and can be sufficiently flexible and/or pliable to be able to conform to the bend of the handle 130. The heat-protection element 160 also can be the entire handle; that is, the handle can be made entirely of the material from which a heat-protection element 160 could be made.

The food press utensil 100 need not be limited to stainless steel, but may be made from any metal or other material that is safe to use in cooking that is known in the art, including but not limited to chrome-plated carbon steel, cast iron, non-stick cooking surfaces, and the like.

Figure 4:
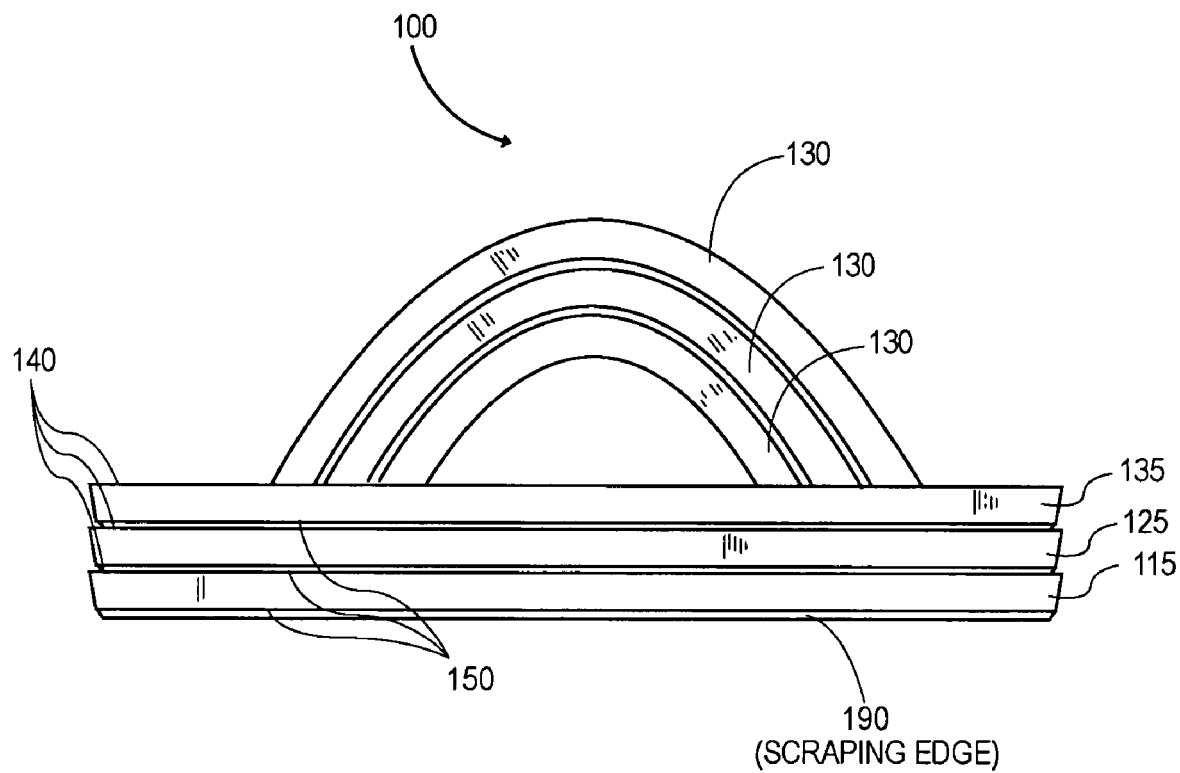
FIG. 4 depicts a side view of the three stacked food press embodiments of the disclosed invention depicted in FIG. 1.

As seen in FIGS. 2 and 4, a preferred embodiment of the food press utensil 100 of the invention comprises a scraper edge 190 along at least one edge of the body 110. The scraper edge 190 can be used to clean debris or other matter from the cooking surface, for example a griddle or a pan, to clean and prepare the cooking surface to be used for cooking. The scraper edge 190 in a preferred embodiment can be along a longer edge of a body 110 of a rectangular food press utensil 100. However, the scraper edge 190 alternatively can be made any edge, or along any of a plurality of edges, depending upon the geometric or circular shape of the body 110. The scraper edge 190 in a preferred embodiment can have a tapered, wedge shape, extending from whichever edge of the body 110 with which the scraper edge 190 is extended. For effective scraping, the narrowest part of the scraper edge 190 should be further from the body 110 than the widest portion of the scraper edge 190. In other words, the scraper edge 190 extends from a side of the body 110 and narrows away from the body 110. The scraper edge 190 can be welded to the body 110, hammered from the body 110, or can be worn down, for example by filing, from and edge of the body 110.

In one preferred embodiment, the food press utensil 100 weighs about 12 ounces. However, other weights also are contemplated by the various embodiments of the invention disclosed herein. For example, the food press utensil 100 could weigh 10 ounces, 14 ounces, or any metric or non-metric measurement of weight.

Figure 3:
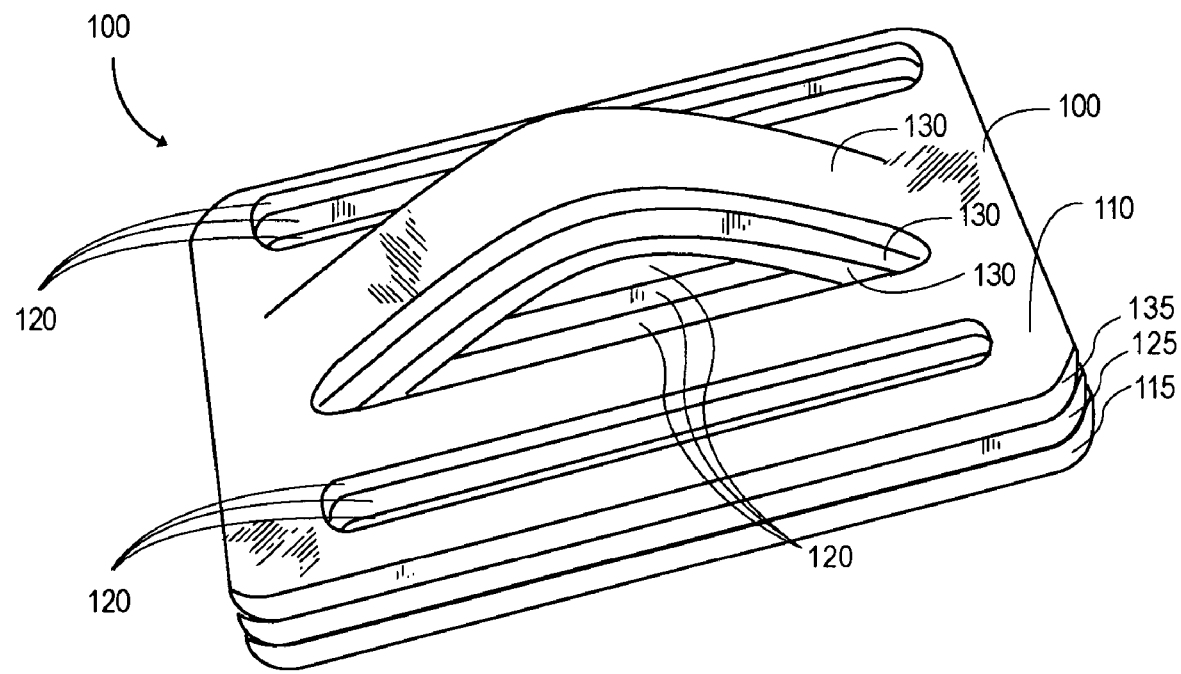
FIG. 3 depicts a top-down view of three of the food press utensil embodiments of the disclosed invention depicted in FIG. 1, stacked one on top of another.

FIGS. 3 and 4 depict a novel aspect of the food press utensil 100 that is novel over the prior art. Specifically, a plurality of food press utensils 100 can be stacked upon each other to vary incrementally the weight upon the cooking food. FIGS. 3 and 4 show three food press utensils stacked together; however, it is to be understood that more than three and as few as two food press utensils 100 can be stacked upon each other. This stacking aspect finds utility, for example, in the fact that cooking different kinds of food generally requires different amounts of pressure from a food press to cook uniformly and brown evenly. For example, a single food press utensil 100 likely will suffice to press flat against a cooking surface a thin filet of fish or chicken, or vegetables and fruits, while in contrast, two or more food press utensils 100 could be stacked upon each other to press down evenly a pork chop, burger, or piece of steak. Even more food press utensils 100 can be stacked for thicker versions of the chops, burgers, and steak. It is to be understood, however, that even though at least two food press utensils 100 are noted for meats, chops, etc., it is contemplated by this disclosure that one food press utensil 100 might also suffice, depending upon the weight as manufactured, and of course, depending upon a particular item of food.

Another utility of the present invention is realized, for example, in knowing how much incremental weight is being added by stacking several of the same food presses 100 disclosed herein. By using several of the same food press utensils 100 stacked upon each other, there is no need for a cook to search for several different types of food presses of different weights, or to remember how much each different food press weighs. Using the present invention disclosed herein, a cook knows how much weight he or she is adding to the press the food. Also, the present invention eliminates the need for having un-matched, different products of different sizes from which to select while in the middle of cooking. The invention disclosed herein thus has at least convenience and aesthetic value.

FIGS. 3 and 4 depict how slots 120 and handles accommodate each other to allow stacking of at least two food presses 100. A handle 130 of a first, lower food press utensil 115, also referred to as a base food press, passes through a slot 120 of a second food press utensil 125, wherein the slot 120 of the second food press utensil 125 is the slot 120 created from bending out the handle 130 of the second utensil when the food press utensils 100 are manufactured. The handle 130 of the base food press 115 and the handle 130 of the second food press utensil 125 are substantially the same shape, and thus conform to each other's contours as the base food press 115 and the second food press utensil 125 are stacked together. Also, the upper surface 140 of the first, lower food press utensil 115 meets the lower surface 150 of the second food press utensil. It should be noted again that the lower surface 150 of a first, lower food press utensil 115, and a lower surface 150 of a food press utensil 100 used alone, are the surfaces that make contact with the food being pressed.

Stacking of food press utensils 100 can continue, so as to add a plurality of food press utensils 100. For example, as depicted in FIGS. 3 and 4, A third food press utensil 135 can be stacked onto the second food press utensil 125 from above the second food press utensil 125, so that the third food press utensil 135 become an upper food press utensil. Stacking of food press utensils 100 can continue substantially as described which, as set forth above, increases the weight and pressure on the food that is being pressed and cooked.

Figure 5:
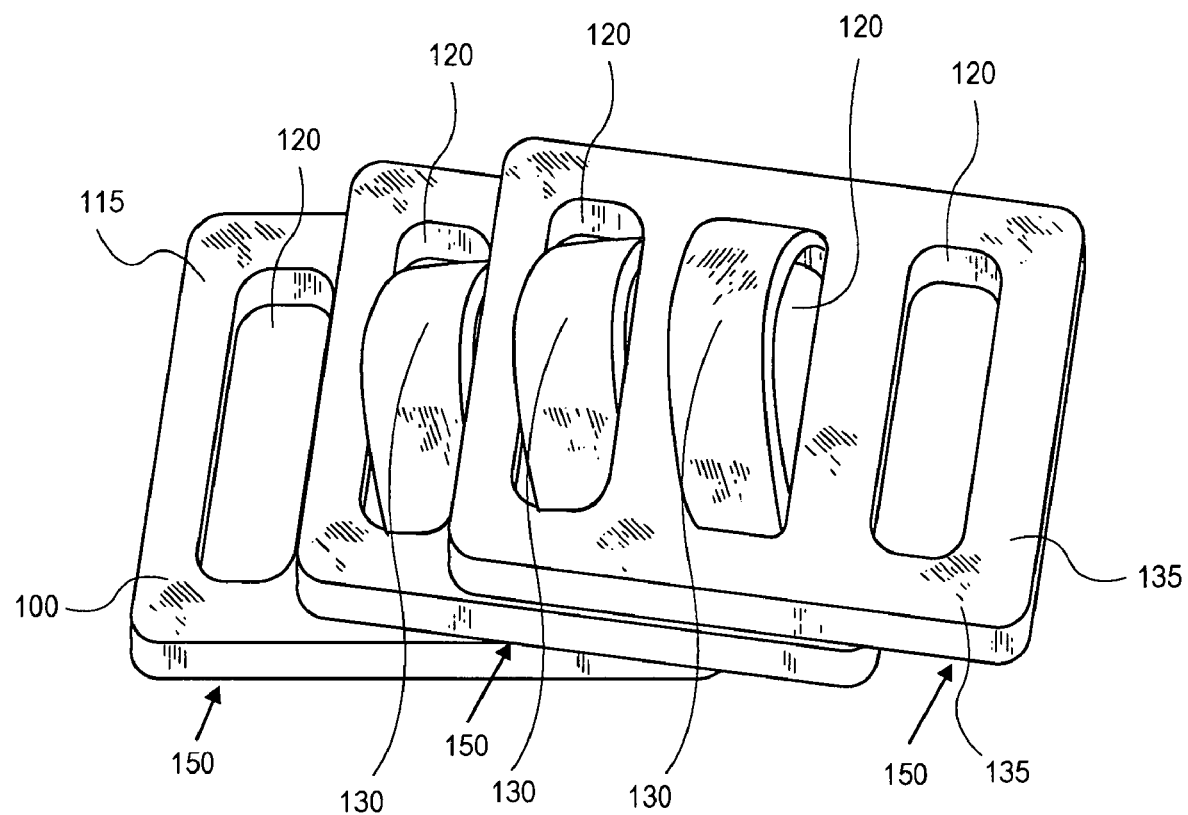
FIG. 5 depicts a top view of three of the food press utensil embodiments of the disclosed invention depicted in FIG. 1, in an alternative, stacked conformation.

FIG. 5 depicts an alternative configuring of a plurality of food press utensils 100 that can be applied to press an item of food whose surface area exceeds the surface area covered by a single food press utensil 100 of a particular size. For example, if a steak is too long to press with a single food press utensil 100, then at least two food press utensils 100 can be configured in an extended configuration so that they can be used together to cook the steak. FIG. 5 depicts three food press utensils 115, 125, and 135 in the extended configuration; however, it is understood that the disclosed invention contemplates that at least two or a plurality of food press utensils 100 can be arranged in the extended configuration to cover less or more food surface area, respectively.

As illustrated in FIG. 5, in the extended configuration, a first food press utensil 115 and a second food press utensil can be arranged to so that the handle 130 of the first food press utensil 115 passes through a first slot 120 in the body 110 of the second food press utensil 125, and emerges through said slot 120 to the upper surface 140 of the second food press utensil 125. The lower surface 150 of the first food press utensil 115 lies completely over the food that is being pressed. The upper surface 140 of the first food press article 115 is partially in contact with the lower surface 150 of the second food press utensil 125, and partially free of contact with any food press utensil 100. The lower surface 150 of the second food press utensil 125 is partially in contact with the upper surface 140 of the first food press utensil 115, and partially in contact with the food that is being pressed and cooked. So far in this extended configuration, the handle 130 of the first food press utensil 115 emerges from below the second food press utensil 125 through the first slot 120 of the second food press utensil 125.

As depicted in FIG. 5, a third food press utensil 135 can be added to the extended configuration in substantially the same way. It is understood that subsequent food press utensils 100 also can be added to cover the food as necessary, depending upon the surface area of the particular food item, and the surface area of a particular food press utensil 100 as manufactured. In the extended configuration with three food press utensils 100 depicted in FIG. 5, the handle 130 of the second food press utensil 125 passes through a first slot 120 of the third food press utensil 135, from below the third food press utensil 135. The lower surface 150 of the second food press utensil 125 remains partially in contact with the upper surface 140 of the first food press utensil 115, as described above. However, the upper surface 140 of the second food press utensil 125 is brought into partial contact with the lower surface 150 of the third food press utensil 135. The lower surface 150 of the third food press utensil 135 thus is partially in contact with the upper surface 140 of the second food press utensil, and partially in contact with the food item being pressed and cooked. In this way, the surface area that the food press utensils 100 can contact is extended in the extended configuration. The handles 130 of each of the food press utensils 115, 125, and 135 can be used to press evenly down on the food being cooked, over the entire surface area of the food.

FIG. 6 shows an alternative embodiment 200 of the present invention disclosed herein. Embodiment 200 can comprise the same materials as set forth above for embodiment 100. As in the previously-described embodiment 100, embodiment 200 has a handle 230 preferably cut and bent upward from a body 210, leaving a slot 220 through the body 210 below the handle 230. The body 210 can be rectangular in shape, as depicted in FIG. 6. In a preferred embodiment, the body 210 is about 5 inches long by 4 inches wide. However, it is to be understood that the body 210 also can be square or have another polygonal shape, or can be circular, or oblong, and can have different dimensions of length and width than those of the preferred embodiment.

In this embodiment 200, in addition to having a slot 220 associated with the handle 230, the body 210 has a plurality of holes 295 extending through a lower surface 150 to an upper surface 240 of the body 210, wherein the lower surface 250, as in the previously-described embodiment 100, can be pressed against the food from above the cooking surface and the food, so as to apply the pressure and weight needed to effect even cooking and browning. The holes 295, like the slots 120 in the first-described embodiment 100, allow steam from the cooking, pressed food to vent to avoid sogginess and to allow the food to brown. As described below in greater detail, and similar to the embodiment 100, the lower surface 250 of food press utensil 200 can also come to rest upon an upper surface 240 of another body 210 of another food press 200 if at least two such food press utensils 200 are stacked upon each other.

The handle 230, as described for embodiment 130, can be used for gripping the food press utensil 200 during cooking, to remove the food press utensil 200 from the food or to press the food press utensil 200 down harder onto the food as it cooks. It is contemplated that the handle 230 will be oriented parallel to an edge of the food press utensil 200. In a preferred embodiment, the handle 230 is oriented parallel to a long edge of a rectangular body 210, and is centered so that the handle 230 is balanced relative to the food press utensil 200 for easy handling. It is to be understood that the handle 230 can be oriented in any direction for any shape of food press utensil 200; in a preferred embodiment, the handle is balanced relative to the food press utensil 200.

As with embodiment 100, the food press utensil 200 in a preferred embodiment can be made from a single piece of metal, and the handle 230 can be cut and pressed out of the metal of the body 210, substantially as described above for embodiment 100. In addition, a handle 230 can be welded or glued, or otherwise connected with, rather than cut from, the body 210 of the food press utensil 200.

Substantially as depicted in FIG. 2 for embodiment 100, embodiment 200 can have a heat protection component 160 placed about the handle 230 to protect a user from heat conducted to the handle 230 from the cooking surface. The heat protection component can be substantially as described for embodiment 100.

As seen in FIG. 7, as with embodiment 100, the food press utensil 200 in a preferred embodiment can have a scraper edge 290 along at least one edge of the body 210, for cleaning debris from a cooking surface. The scraper edge 290 in a preferred embodiment can be along a longer edge of the body 210 of a rectangular food press 200 or, alternatively, along any edge, or along a plurality of edges, depending upon the shape of the body 210, or along a curve of the body 210, should the body 210 have a shape having rounded edges, such as a circle or oval. The scraper edge 290 should have a tapered, wedge shape, extending from which ever edge of the body 210 with which the scraper edge 290 is associated. As with embodiment 100, the scraper edge 290 can extend from a side of the body 210, and narrow from the point of contact between the edge of the body 210 and the scraper edge 290 to form the desired wedge shape. The scraper edge 290 can be welded to the body 210, hammered from the body 210, or worn down from and edge of the body 210, for example by filing.

As with the embodiment 100, a preferred embodiment of the press 200 weighs about 12 ounces, but the disclosure of the present invention contemplates that other weights.

Also as with embodiment 100, a plurality of food press utensils of embodiment 200, having only one slot 220 below the handle 230, can be stacked, one on top of another, to increase incrementally the weight to be used to press and cook different types of food. FIG. 7 depicts the stacking of three food press utensils 215, 225, and 235, although it is to be understood that as few as two or a plurality of food press utensils 200 can be stacked on each other to increase incrementally the weight used to press food being cooked.

The stacking depicted in FIG. 7 is substantially similar to the stacking for embodiment 100 depicted in FIGS. 3 and 4. That is, a slot 220 accommodates the passage of a handle 230 to allow stacking of at least two food press utensils 200. A handle 230 of a first, lower food press utensil 215 passes through a slot 220 of a second food press utensil 225. The handle 230 of the first, lower food press utensil 215 and the handle of the second food press utensil 225 come into contact and, because they are substantially the same shape, the two handles 230 conform to each other's contours as the first, lower food press utensil 215 and the second food press utensil 225 are stacked together. Also, in stacking, the upper surface 240 of the first, lower food press utensil 215 meets the lower surface 250 of the second food press utensil 225. The lower surface 240 of the first, lower food press utensil 215 contacts the food to be pressed and cooked.

A third food press utensil 235 is depicted in FIG. 7 as stacked on top of the second food press 225, although as noted above, a plurality of food press utensils 200 can be stacked to add increasing increments of weight. The handle 230 of the second food press utensil 225 fits from below the body 210 of the third food press utensil 235 through the slot 220 of the third food press utensil and conforms to the handle 230 of the third food press utensil. The lower surface 250 of the third food press utensil 235 rests on the upper surface 240 of the second food press utensil 225, and the third food press utensil 235 replace the second food press utensil 225 as an upper food press utensil.

Figure 8:
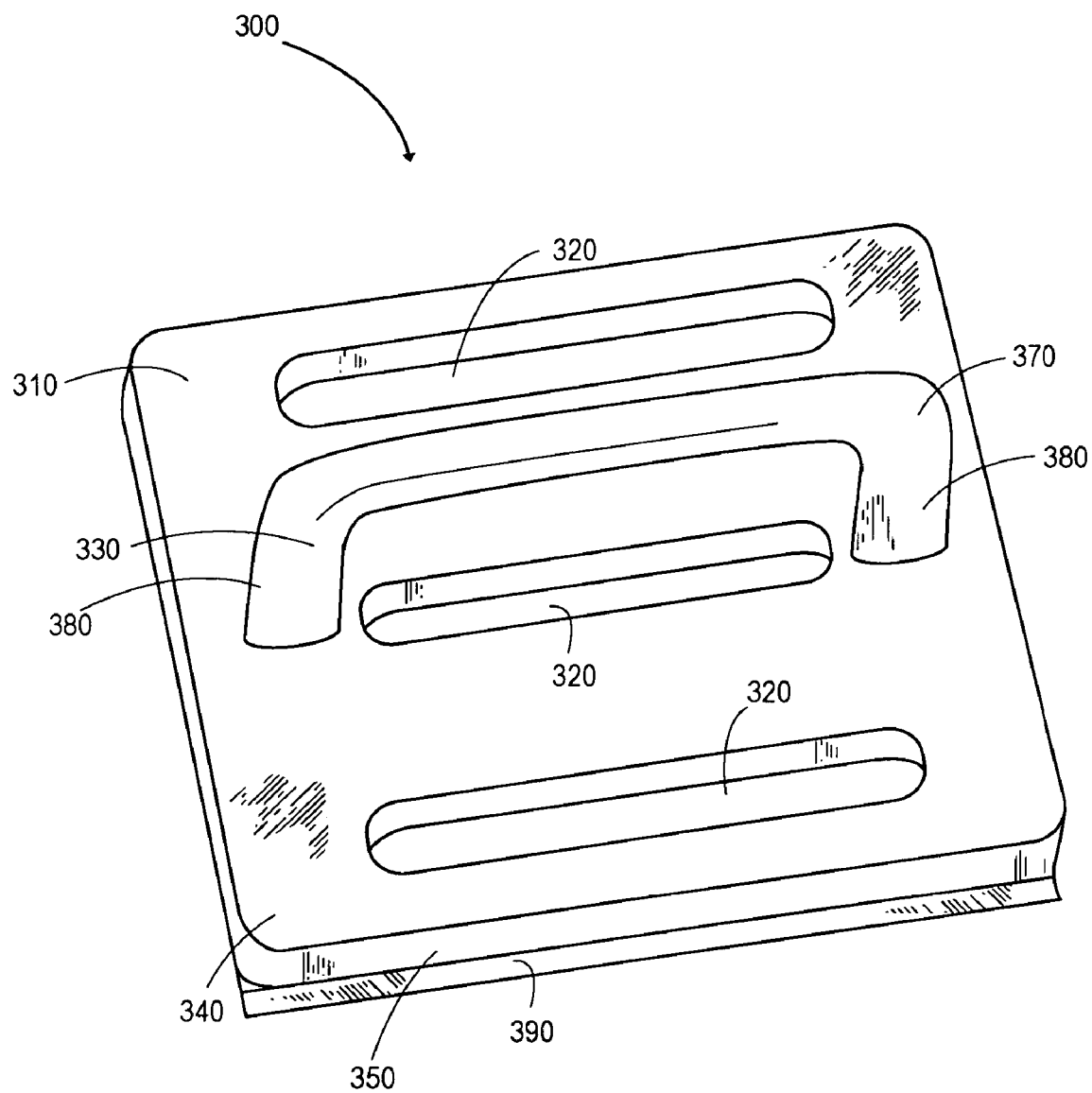
FIG. 8 depicts a top-down view of a further embodiment of the food press utensil of the disclosed invention.
Figure 9:
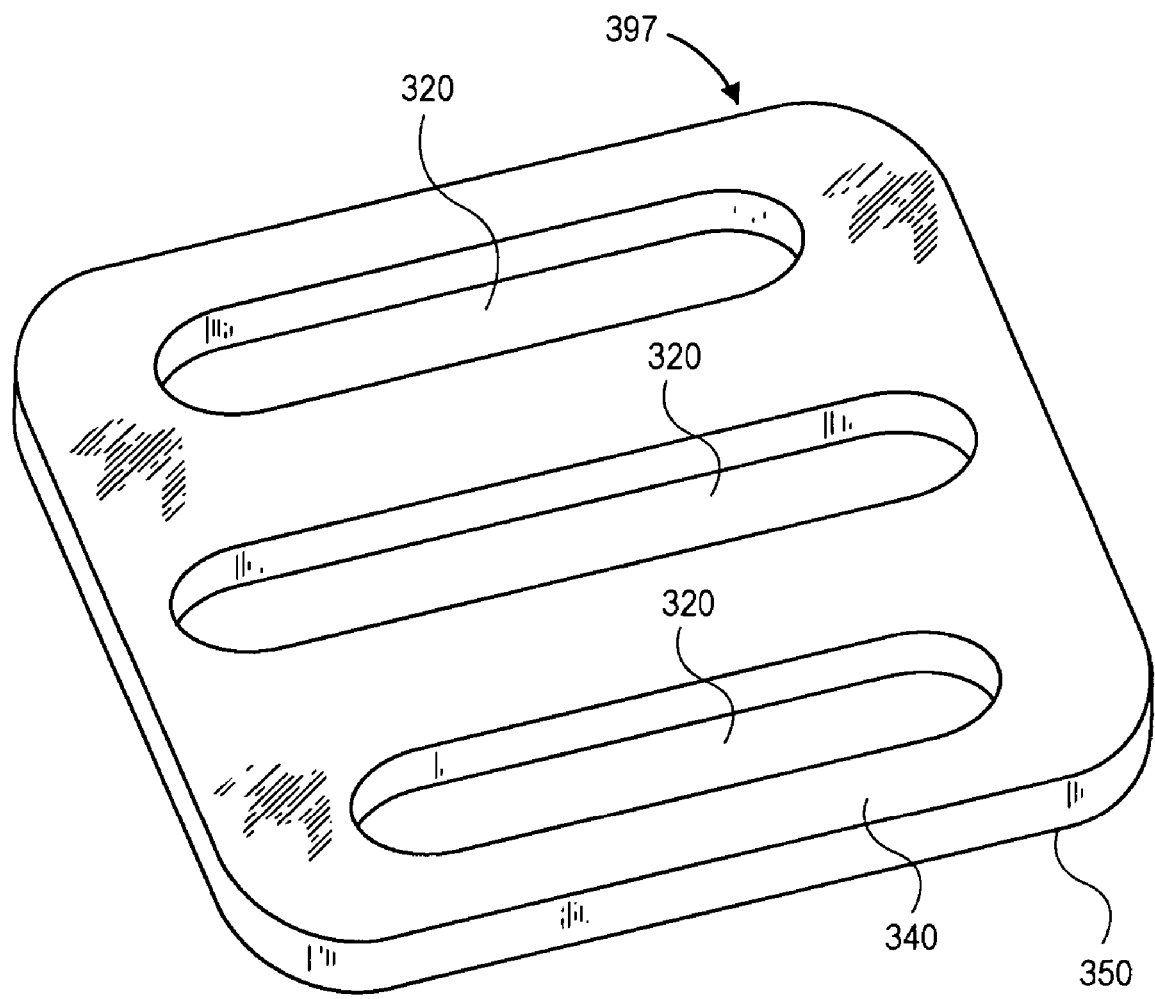
FIG. 9 depicts a top-down view of a stackable weight of the embodiment of the food press utensil of the disclosed invention depicted in FIG. 8.

FIGS. 8 and 9 depict a further embodiment 300 of the present invention that can have stackable weights to adjust incrementally the weight to be applied on top of a cooking food item. In this embodiment 300, however, in contrast to the other embodiments 100 and 200, and their equivalents, rather than stacking other substantially identical food presses on a base food press 100, 200, incremental weights 397 instead can be added to the base utensil 300, which are designed to fit with the base utensil 300. The base utensil 300 has a body 310 with a plurality of apertures 320 extending from an upper surface 340 to a lower surface 350. As with other embodiments, the apertures 320 can comprise slots and/or holes of any shape. The lower surface 350 is the surface used to press the food. The food press utensil 300 also can have a scraper edge 390 substantially as disclosed for embodiments 100 and 200.

The base utensil 300 can have a handle that is pressed out of a cut slot from the same piece of material as the body 310. Alternatively, as depicted in FIGS. 8 and 9, the base utensil 300 can have a handle 330 that is made separately from the body 310 and then connected with the body 310. That is, the handle 330 can comprise at least one post but preferably two posts 380 set apart from each other and supporting a handle bar 370. The posts 380 can be connected with the body 310 by snap-fit mechanism, welding, screws, or any other appropriate mechanism. The posts 380 can be made out of the same metal as the body 310, or a different metal appropriate for cooking or other non-flammable material. The handle bar 370 can be made of wood, to minimize the heat conducted to the user's hand when gripping the handle bar 370. Alternatively, the handle bar 370 also can be made of a metal and/or or a plastic or rubberized plastic that resists heat and will not melt or otherwise be damaged from heat.

The body 310, as described for embodiments 100 and 200, can be of any size, shape, and thickness, and preferably can weigh twelve ounces, although the weight need not be twelve ounces, as disclosed above.

The weight of the body 310 can be varied incrementally by stacking on top of the body 310 at least one or a plurality of stacking elements 397 (FIG. 9). The stacking elements 397 can have the same weight as the body 310, or can be of any other convenient increment of weight, and can be made of the same materials as the body 310 is made. Each stacking element 397 would have an area dimension substantially the same as an area dimension of the body 310, so that the stacking elements 397 stack in conforming shape with the body 310, with the edges of the body 310 flush with the edges of the stacking elements 397 (except for a scraping element 390 in a preferred embodiment comprising a scraping element 390). The stacking elements 397 would have substantially the same number, size, and location of apertures 320 as the body 310, so that the apertures 320 of the body 310 would align with the apertures 320 of the stacking elements 397, and would not be blocked by the stacking elements 397, and steam could continue to vent from the pressed food. Additionally, an aperture 320 of the stacking element 327 would have to accommodate the handle 330 of the body 310 to allow the handle to pass through the aperture 320 of the stacking element 397, so that a lower surface 350 of the stacking element 397 could rest upon an upper surface 340 of the body 310. The posts 380 of the body 310 also would have to be of sufficient length to accommodate a plurality of stacking elements 397 being stacked over the handle 330, so that the handle 330 of the body 310 could still be used for gripping and pressing down upon the food press utensil 300.

The foregoing description of the present invention has been presented for purposes of illustration and description. It is not intended to be exhaustive or to limit the invention to the precise forms disclosed. Many modifications and variations will be apparent to practitioners skilled in this art. The embodiments were chosen and described in order to explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed:

1. A food press utensil for food preparation, said food press utensil adapted for incremental weight variation, comprising:
   a base food press utensil further comprising:
      a substantially flat body with an upper surface and a lower surface, the substantially flat body having a plurality of apertures that pass through the upper surface and the lower surface; and
      a handle functionally connected with the body and accessible from the upper surface; and
   a plurality of incremental weights, wherein at least one said incremental weight can be arranged in a configuration with the base food press utensil to vary the weight pressing down on a food item on a cooking surface; and
   wherein:
      the configuration is a stack;
      the at least one compatible weight increment is an additional food press utensil made to be identical to the base food press utensil, wherein the additional food press utensil is adapted to be stacked on top of the base food press utensil;
      the base food press utensil has a handle slot beneath the handle and through the body of the base food press utensil;
      the additional food press utensil has a handle slot beneath the handle and through the body of the additional food press utensil; and
      the handle of the base food press utensil is passed up from the lower surface through the handle slot of the additional food press utensil to comprise the stack, wherein the handle of the base food press utensil contacts and conforms with the handle of the additional food press utensil and a lower surface of the additional food press utensil contacts and conforms with the upper surface of the base food press utensil.

2. The food press utensil as claimed in claim 1 wherein the body comprises a metal that is safe for cooking food.

3. The food press utensil as claimed in claim 2 wherein the metal is stainless steel.

4. The food press utensil as claimed in claim 1 wherein the body is rectangular.

5. The food press utensil as claimed in claim 1 further comprising a scraper edge along at least one edge of the body, the scraper edge adapted to remove debris from a cooking surface.

6. The food press utensil as claimed in claim 1 wherein the body comprises a non-stick surface.

7. A food press utensil for food preparation, said food press utensil adapted for incremental weight variation, comprising:
   a base food press utensil further comprising:
      a substantially flat body with an upper surface and a lower surface, the substantially flat body having a plurality of apertures that pass through the upper surface and the lower surface; and
      a handle functionally connected with the body and accessible from the upper surface;
   a plurality of incremental weights, wherein at least one said incremental weight can be arranged in a configuration with the base food press utensil to vary the weight pressing down on a food item on a cooking surface;
   wherein the plurality of apertures comprise a plurality of slots wherein said slots allow the food item to cook and brown evenly, and said slots are of a size that accommodate passage of the handle;
   wherein the configuration is an extended configuration wherein the food press utensil is adapted to cover a surface area of a food item that exceeds a surface area of the body of the base food press utensil; and
   wherein the extended configuration further comprises:
      the at least one incremental weight is an additional food press utensil made to be identical to the base food press utensil; and
      the handle of the base food press utensil is passed upward through a slot of the additional food press utensil to extend above an upper surface of the body of the additional food press utensil, the slot being other than a handle slot below the handle of the additional food press utensil, and the base food press utensil and the additional food press utensil partially overlap to extend the surface area of the food press utensil.

8. The food press utensil as claimed in claim 7 wherein the body comprises a metal that is safe for cooking food.

9. The food press utensil as claimed in claim 8 wherein the metal is stainless steel.

10. The food press utensil as claimed in claim 7 wherein the body is rectangular.

11. The food press utensil as claimed in claim 7 further comprising a scraper edge along at least one edge of the body, the scraper edge adapted to remove debris from a cooking surface.

12. The food press utensil as claimed in claim 7 wherein the body comprises a non-stick surface.

13. A food press utensil for food preparation, said food press utensil adapted for incremental weight variation, comprising:
    a base food press utensil further comprising:
        a substantially flat body with an upper surface and a lower surface, the substantially flat body having a plurality of apertures that pass through the upper surface and the lower surface; and
        a handle functionally connected with the body and accessible from the upper surface;
    a plurality of incremental weights, wherein at least one said incremental weight can be arranged in a configuration with the base food press utensil to vary the weight pressing down on a food item on a cooking surface; and
    wherein:
        the handle of the base food press further comprises a first post and a second post connected at ends distal from the upper surface of the body by a gripping member, said first post and said second post having a length sufficient to stack a plurality of weight increments on the upper surface of the body of the base food press utensil while leaving sufficient gripping space for a user to grip the gripping member; and
        the plurality of weight increments each further comprising a slot for allowing passage of the handle so that the plurality of weight members can be stacked about the handle and onto the upper surface of the body of the base food press utensil.

14. A food press utensil for food preparation, said food press utensil adapted for incremental weight variation, comprising:
    a base food press comprising:
        a substantially flat body made of a material, the body having an upper surface, a lower surface, and a perimeter, the body having a plurality of slots that pass through the upper surface and lower surface of the body, said slots adapted to vent steam from cooking food to allow browning;
        a scraper edge along at least one segment of the perimeter for cleaning debris from a cooking surface;
        a handle comprising a segment of a material cut and pressed from the body, extending above the upper surface and a handle slot; and
        the handle slot beneath the handle and able to accommodate passage of another handle of an additional food press from beneath the body until the another handle meets the handle of the base food press from below; and
    a plurality of said additional food presses made to be substantially identical to the base food press to allow uniform stacking of the base food press with additional weight in the form of the plurality of additional food presses.

15. The food press utensil as in claim 14 wherein the plurality of slots and the perimeter of the base food press and of the plurality of additional food presses align for said uniform stacking.

16. The food press utensil as in claim 14 wherein the base food press has a scraper edge, and none of the plurality of additional food presses have a scraper edge.

17. The food press utensil as in claim 14 wherein the food press utensil further comprises a heat-protection component placed about the handle to protect the user from heat.

18. The food press utensil as in claim 17 wherein the heat protection component covers a portion of the entire handle.

19. The food press utensil as in claim 17 wherein the heat protection component is made of rubberized plastic.

20. A food press utensil for food preparation, said food press utensil adapted for incremental weight variation, comprising:
    a base food press comprising:
        a substantially flat body made of a material, the body having an upper surface, a lower surface, and a perimeter, the body having a plurality of apertures that pass through the upper surface and lower surface of the body, said apertures adapted to vent steam from cooking food to allow browning;
        a scraper edge along at least one segment of the perimeter for cleaning debris from a cooking surface;
        a handle comprising a segment of a material cut and pressed from the body, extending above the upper surface and a handle slot; and
        the handle slot beneath the handle and able to accommodate passage of another handle of an additional food press from beneath the body until the another handle meets the handle of the base food press from below; and
    a plurality of said additional food presses made to be substantially identical to the base food press to allow uniform stacking of the base food press with additional weight in the form of the plurality of additional food presses.

21. A food press utensil for food preparation, said food press utensil adapted for incremental weight variation, comprising:
    a base food press comprising:
        a substantially flat body made of a material, the body having an upper surface, a lower surface, and a perimeter, the body having a plurality of apertures that pass through the upper surface and lower surface of the body, said apertures adapted to vent steam from cooking food to allow browning;
        a scraper edge along at least one segment of the perimeter for cleaning debris from a cooking surface; and
        a handle upon which a plurality of stacking elements can be stacked onto the upper surface of the body of the base food press to add weight incrementally to the food press utensil; and
    the plurality of stacking elements made to be substantially identical to a shape of the body of the base food press so that the perimeter of the body of the base food press and a perimeter of each of said stacking elements align, and the plurality of stacking elements made to have substantially identically positioned apertures as the apertures of the body of the base food press, the plurality of stacking elements adapted to allow uniform stacking of the base food press with additional weight.

22. The food press utensil as in claim 21 wherein the handle further comprises:
    at least one post functionally connected with the body of the base food element; and
    a handle bar connected with the at least one post, wherein the handle is adapted to receive over the handle the plurality of stacking elements.

23. The food press utensil as in claim 21 wherein each of the plurality of stacking elements has an aperture through the element at a substantially identical position, each aperture adapted to allow each said stacking element to be received over said handle and to align the perimeter of each said stacking element with each other said stacking element and with the perimeter of the body of the base food press.

* * * * *

UNITED STATES PATENT AND TRADEMARK OFFICE
CERTIFICATE OF CORRECTION

PATENT NO. : 7,586,067 B2  Page 1 of 1
APPLICATION NO. : 11/174233
DATED : September 8, 2009
INVENTOR(S) : Bruce M. Hill It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 846 days.

Signed and Sealed this

Fourteenth Day of September, 2010

David J. Kappos
*Director of the United States Patent and Trademark Office*